(12) United States Patent
Zeituni et al.

(10) Patent No.: US 12,526,551 B2
(45) Date of Patent: Jan. 13, 2026

(54) PIXEL CIRCUIT AND SOLID-STATE IMAGING DEVICE

(71) Applicant: Sony Semiconductor Solutions Corporation, Atsugi (JP)

(72) Inventors: Golan Zeituni, Stuttgart (DE); Noam Zeev Eshel, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 210 days.

(21) Appl. No.: 18/275,221

(22) PCT Filed: Feb. 17, 2022

(86) PCT No.: PCT/EP2022/053943
§ 371 (c)(1),
(2) Date: Aug. 1, 2023

(87) PCT Pub. No.: WO2022/179930
PCT Pub. Date: Sep. 1, 2022

(65) Prior Publication Data
US 2024/0107201 A1    Mar. 28, 2024

(30) Foreign Application Priority Data

Feb. 23, 2021 (EP) .................................... 21158782

(51) Int. Cl.
*H04N 25/78* (2023.01)
*H04N 25/709* (2023.01)
(Continued)

(52) U.S. Cl.
CPC ........... *H04N 25/78* (2023.01); *H04N 25/709* (2023.01); *H04N 25/771* (2023.01); *H10F 39/18* (2025.01); *H10F 39/803* (2025.01)

(58) Field of Classification Search
CPC .... H04N 25/78; H04N 25/709; H04N 25/771; H04N 25/77; H04N 25/57; H10F 39/18; H10F 39/803
See application file for complete search history.

(56) References Cited

U.S. PATENT DOCUMENTS

| 10,200,573 | B2 * | 2/2019 | Yoneda | ................ | H04N 25/707 |
| 2008/0035966 | A1 * | 2/2008 | Hwang | ................ | H04N 25/766 |
| | | | | | 257/292 |

(Continued)

OTHER PUBLICATIONS

International Search Report and Written Opinion mailed on May 4, 2022, received for PCT Application PCT/EP2022/053943, filed on Feb. 17, 2022, 9 pages.

(Continued)

*Primary Examiner* — Albert H Cutler
(74) *Attorney, Agent, or Firm* — XSENSUS LLP

(57) ABSTRACT

A pixel circuit (100) includes a photoelectric conversion circuit (110), an integration capacitor (Cint) and a supplementary circuit (120). The photoelectric conversion circuit (110) generates and outputs a photocurrent (Iphoto). The integration capacitor (Cint) includes a storage electrode (CintS) and a reference electrode (CintR), wherein the reference electrode (CintR) is connected to a first supply potential (VSUP1), and wherein the integration capacitor (Cint) is configured to integrate the photocurrent on the storage electrode (CintS) in an integration period (Tint). The supplementary circuit (120) pre-charges a working node (WN) between the photoelectric conversion circuit (110) and the storage electrode (CintS) to a pre-charge potential (Vpre) that differs from the first supply potential (VSUP1).

15 Claims, 15 Drawing Sheets

(51) Int. Cl.
*H04N 25/771* (2023.01)
*H10F 39/00* (2025.01)
*H10F 39/18* (2025.01)

(56) References Cited

U.S. PATENT DOCUMENTS

| | | | | |
|---|---|---|---|---|
| 2015/0009379 A1* | 1/2015 | Yan | ............... | H04N 25/772 |
| | | | | 257/225 |
| 2015/0332568 A1* | 11/2015 | Kurokawa | ........... | H04N 23/667 |
| | | | | 348/152 |
| 2016/0021314 A1* | 1/2016 | Kurokawa | ........... | H04N 25/771 |
| | | | | 348/333.01 |
| 2016/0316159 A1* | 10/2016 | Yoneda | ............... | H10F 39/8037 |
| 2018/0184020 A1 | 6/2018 | Vampola et al. | | |
| 2020/0111826 A1* | 4/2020 | Boemler | ............. | H03F 3/45654 |
| 2020/0112698 A1 | 4/2020 | Boemler | | |
| 2022/0264046 A1* | 8/2022 | Inoue | ............... | H04N 25/79 |

OTHER PUBLICATIONS

Vizcaino et al., "Design of Low Power CMOS Read-Out with TDI Function for Infrared Linear Photodiode Array Detectors", Source of Acquisition NASA Goddard Space Flight Center, 2006, 4 pages.

* cited by examiner

PIXEL CIRCUIT AND SOLID-STATE IMAGING DEVICE

CROSS-REFERENCE TO RELATED APPLICATIONS

The present application is based on PCT filing PCT/EP2022/053943, filed Feb. 17, 2022, and claims priority to EP Application Serial No. 21158782.9, filed Feb. 23, 2021, the entire contents of each are incorporated herein by reference.

The present disclosure relates to a pixel circuit and a solid-state imaging device. In particular, the disclosure relates to direct injection (DI) pixel readout and to a solid-state imaging device with DI pixel readout.

BACKGROUND

Image sensors in solid-state imaging devices include photoelectric conversion elements generating a photocurrent in proportion to the received radiation intensity. The main function of a pixel circuit is to transform the small photocurrent generated by the photoelectric conversion element into a comparatively large output voltage which a downstream analog-to-digital converter converts into a digital signal. The current-to-voltage transformation can be done by integrating the photocurrent on an electrode of an integration capacitor during a fixed time period (integration time). The integration capacitor voltage at the end of the integration time is approximately proportional to the incident radiation. A DI pixel circuit further includes an injection transistor used as current buffer to pass the photocurrent to the integration capacitor.

SUMMARY

Today, solid-state imaging devices are increasingly integrated in a multitude of battery-powered application systems, e.g. electric vehicles, in which low power consumption of the solid-state imaging device is of high interest.

The present disclosure has been made in view of the above circumstances, and it is therefore desirable to provide a pixel circuit and a solid-state imaging device combining low power consumption with high dynamic range.

According to an embodiment, a pixel circuit includes a photoelectric conversion circuit, an integration capacitor and a supplementary circuit. The photoelectric conversion circuit is configured to generate and output a photocurrent. The integration capacitor includes a storage electrode and a reference electrode. The reference electrode is connected to a first supply potential. The integration capacitor is configured to integrate the photocurrent on the storage electrode in an integration period. The supplementary circuit is configured to pre-charge a working node between the photoelectric conversion circuit and the storage electrode to a pre-charge potential that differs from the first supply potential.

According to another embodiment, a solid-state imaging device includes a pixel array unit that includes a plurality of pixel circuits, wherein each pixel circuit includes a photoelectric conversion circuit, an integration capacitor and a supplementary circuit. The photoelectric conversion circuit is configured to generate and output a photocurrent. The integration capacitor includes a storage electrode and a reference electrode. The reference electrode is connected to a first supply potential. The integration capacitor is configured to integrate the photocurrent on the storage electrode in an integration period. The supplementary circuit is configured to pre-charge a working node between the photoelectric conversion circuit and the storage electrode to a pre-charge potential that differs from the first supply potential.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
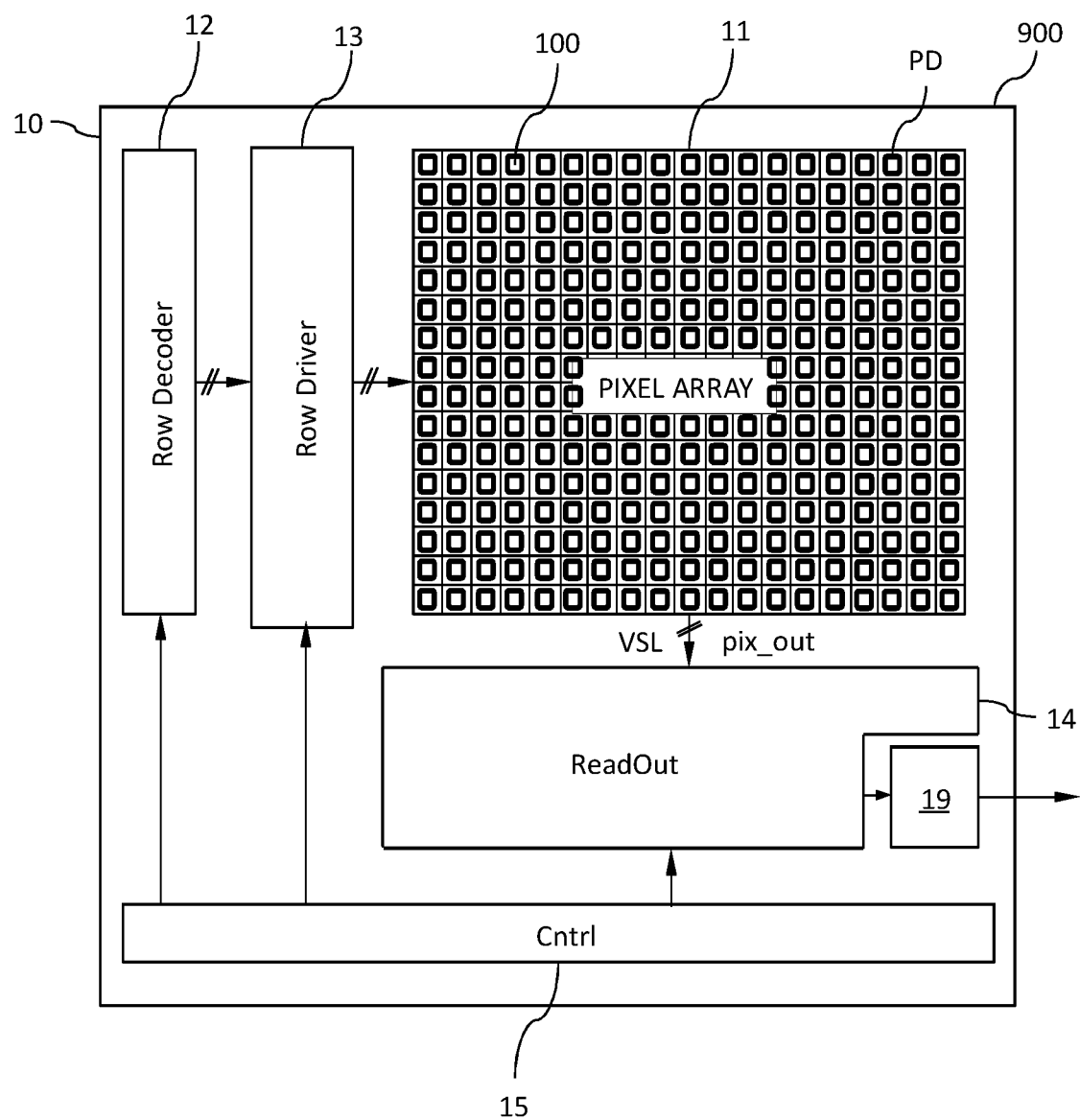
FIG. 1 is a simplified block diagram illustrating an embodiment of a solid-state imaging device according to an embodiment of the present technology.

Referring now to the drawings, wherein like reference numerals designate identical or corresponding parts throughout the several views. In the following, a technology for increasing the dynamic range of pixel circuits without significant increase of power consumption is described in the context of certain types of active image sensors. The technology may also be used for other types of sensors.

FIG. 1 illustrates a configuration example of a solid-state imaging device 10 according to an embodiment of the present technology.

The solid-state imaging device 10 includes a pixel array unit 11, a row decoder 12, a row driver unit 13, a pixel read-out unit 14, a controller 15, and a processing unit 19.

The pixel array unit 11 includes a plurality of pixel circuits 100. Each pixel circuit 100 includes a photoelectric conversion element PD and one or more FETs (field effect transistors) for controlling the output signal of the photoelectric conversion element PD. The photoelectric conversion elements PD may be arranged matrix-like in rows and columns The photoelectric conversion elements PD may be photodiodes capable of being operated in a proportional mode or APDs (avalanche photodiodes), i.e. photodiodes capable of being operated in an avalanche mode. Each pixel circuit 100 may be capable of operating the photoelectric conversion element PD as intensity output pixel, as DVS (dynamic vision sensor) pixel or as APD, e.g. as SPAD (single photon avalanche detection) pixel for event detection.

Each pixel circuit 100 may include at least one amplifying circuit and may generate one or more pixel output signals pix_out. A pixel output signal pix_out may contain a voltage signal proportional to the intensity of the radiation received by the photoelectric conversion element PD. Alternatively or in addition, the pixel output signal pix_out may indicate a change of the radiation intensity detected by the photoelectric conversion element PD. Alternatively or in addition, the pixel output signal pix_out may indicate an event detected by the pixel circuit 100. For example, the pixel circuit 100 may be configured to be operated as the sensor side of a ToF (time-of-flight) sensor.

The row decoder 12 and the row driver unit 13 control selection and driving of the pixel circuits 100 in the pixel array unit 11. That is, the row decoder 12 supplies a control signal for designating the pixel circuit 100 or a row of pixel circuits 100 to be driven or the like to the row driver unit 13 according to an address signal and/or a latch signal supplied from the controller 15. The row driver unit 13 supplies and controls the FETs of the pixel circuit 100 according to driving timing signals supplied from the controller 15 and the control signals supplied from the row decoder 12. Vertical signal lines VSL pass the pixel output signals of the pixel circuits 100 to the pixel read-out unit 14, wherein each vertical signal line VSL may be connected to all pixel circuits 100 of one column of the pixel array unit 11.

The pixel read-out unit 14 may facilitate frame-based imaging based on the use of a fixed capture interval. For frame-based imaging, a region of interest (ROI) of the pixel array or the entire array of pixels may be read out at every frame. Alternatively or in addition, the pixel read-out unit 14 may facilitate asynchronous readouts, which may also be referred to herein as event-driven readouts. Based on the pixel output signals received through the vertical signal lines VSL, the pixel readout unit 14 generates frame-based and/or event-based digital image information and outputs the digital image information to a signal processing unit 19. The signal processing unit 19 may further process the digital image information and may pass the digital image information to another device.

Figure 2:
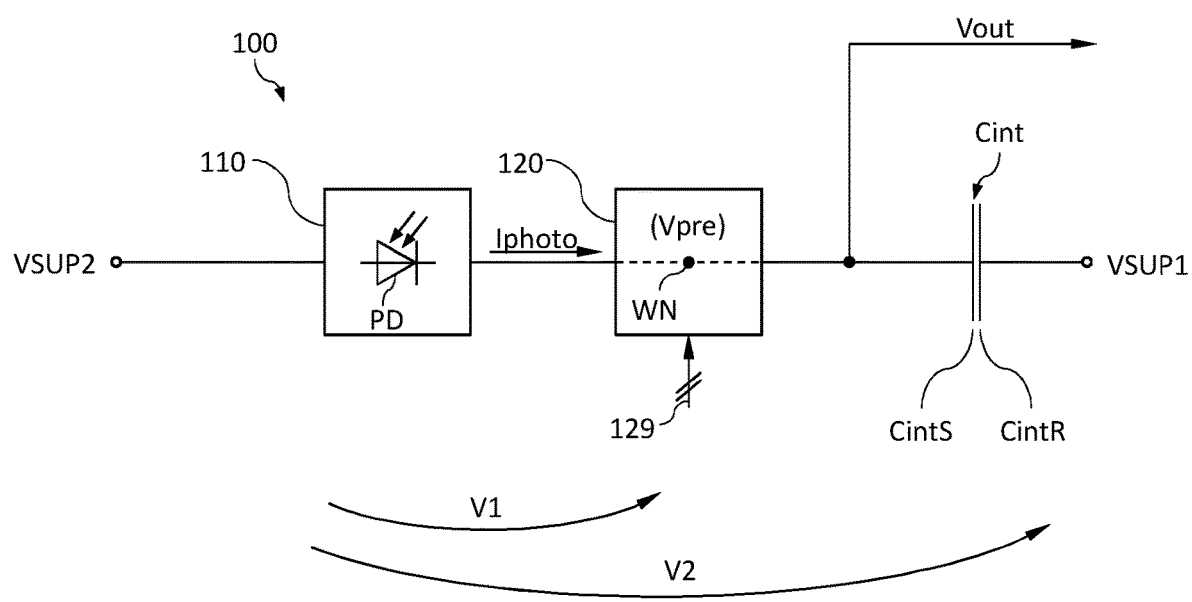
FIG. 2 is a simplified block diagram illustrating a configuration example of a pixel circuit including a supplementary circuit for increasing the dynamic range according to an embodiment.

FIG. 2 shows details of one of the pixel circuits 100 shown as part of the pixel array unit 11 of FIG. 1.

The pixel circuit 100 includes a photoelectric conversion circuit 110, an integration capacitor Cint, and a supplementary circuit 120. The photoelectric conversion circuit 110 generates and outputs a photocurrent Iphoto. The integration capacitor Cint includes a storage electrode CintS and a reference electrode CintR. The storage electrode CintS integrates the photocurrent Iphoto in an integration period. In other words, the storage electrode CintS is charged or discharged in response to the photocurrent Iphoto, wherein the storage electrode CintS may be directly or capacitively coupled to the photocurrent Iphoto. In particular, the charge on the storage electrode CintS is a function, e.g. an approximately linear function of the photocurrent Iphoto.

The reference electrode CintR is connected to a first supply potential VSUP1. The supplementary circuit 120 pre-charges a working node WN between the photoelectric conversion circuit 110 and the storage electrode CintS to a pre-charge potential different from the first supply potential VSUP1.

The photoelectric conversion circuit 110 may include a photoelectric conversion element PD. The photoelectric conversion element PD may be a photodiode sensitive to electromagnetic radiation of a predetermined wavelength range, e.g. for a portion of the wavelength range for visible light and/or for infrared radiation. A supply electrode of the photoelectric conversion element PD is electrically connected to a second supply potential VSUP2. The photoelectric conversion circuit 110 may include further elements and/or circuits for stabilizing, buffering, and/or amplifying the photocurrent signal output by the photoelectric conversion element PD.

Each of the electrodes of the integration capacitor Cint may include a doped diffusion region formed in a semiconductor substrate, a metal structure, or a metal-like semiconductor structure of heavily doped semiconductor material.

The supplementary circuit 120 includes a circuit path electrically coupling the photoelectric conversion circuit 110 and the storage electrode CintS of the integration capacitor Cint, wherein the circuit path may include one or more elements electrically connected in series between the photoelectric conversion circuit 110 and the storage electrode CintS. In addition, the supplementary circuit 120 may include one or more elements with one side electrically connected to a supply voltage or to a reference voltage, by way of example. The supplementary circuit 120 is controllable through one or more supplementary control signals 129.

An operation cycle of the pixel circuit 100 includes a pre-charge period and an integration period. The pre-charge period sets the potential at the storage electrode CintS to a predefined level with respect to the potential at the reference electrode CintR. In the integration period the photocurrent is integrated on the integration capacitor Cint.

That is, the voltage across the integration capacitor Cint follows the photocurrent. The output voltage Vout across the integration capacitor Cint is a function of the photocurrent, which is proportional to the intensity of the received radiation, and of the integration time.

The dynamic range of the pixel circuit 110 is given by the maximum possible voltage swing for the output voltage Vout. The upper limit for the output voltage Vout is basically given by the difference between the first and second supply potentials VSUP1, VSUP2 and the required bias for operating the photoelectric conversion element PD. The lower limit is given by the minimum potential between the photoelectric conversion circuit 110 and the storage electrode CintS at the beginning of the integration period.

Conventionally, pre-charging includes discharging an integration capacitor Cint by short-circuiting the reference electrode CintR and the storage electrode CintS, wherein the storage-electrode is pre-charged with the first supply potential VSUP1.

By contrast, with the supplementary circuit 120 it is possible to pre-charge the working node WN between the photoelectric conversion element and the storage electrode CintS with a potential that differs from the first supply potential VSUP1.

This facilitates an increased voltage swing for the output voltage Vout. The increased voltage swing for the output voltage Vout increases the dynamic range of the pixel circuit 100.

The pre-charge potential Vpre can be selected such that a first potential difference V1 between a second supply potential VSUP2 at a supply electrode of the photoelectric conversion circuit 110 and the pre-charge potential Vpre is greater than a second potential difference V2 between the second supply potential VSUP2 and the first supply potential VSUP1.

The polarity of the pre-charge potential Vpre with respect to the first supply potential VSUP1 depends on the way the photoelectric conversion circuit 110 and the integration capacitor Cint are connected between a positive and a negative supply potential.

Figure 3A:
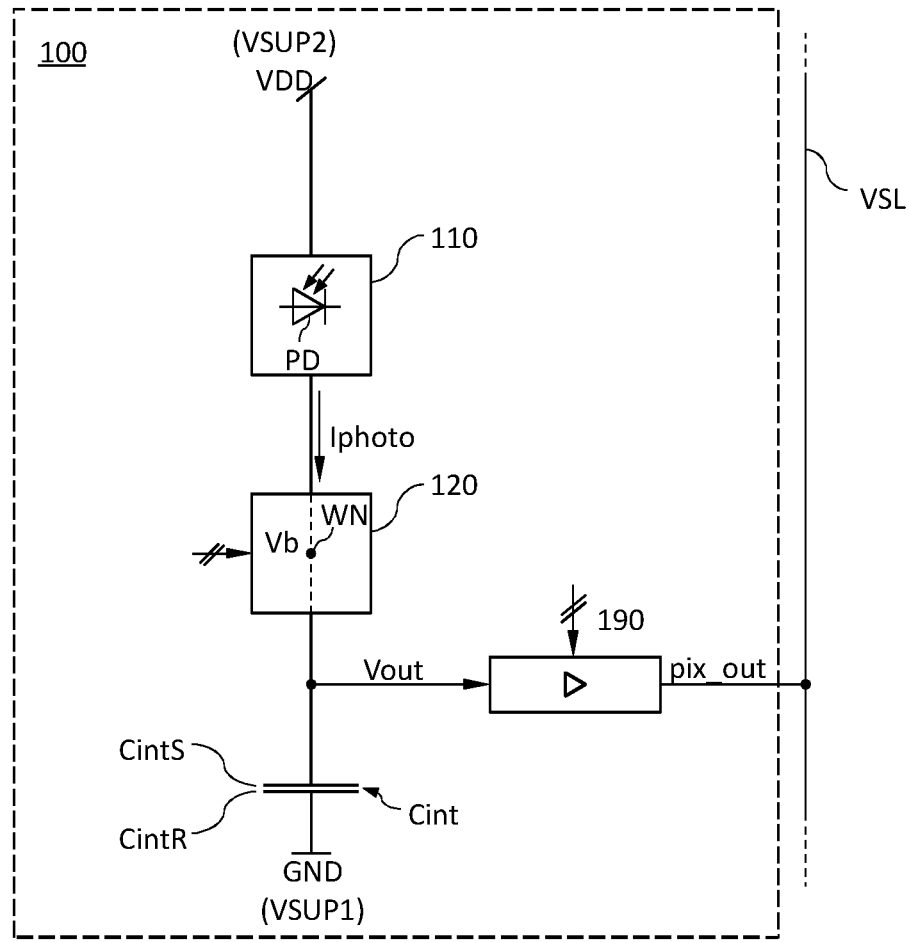
FIG. 3A is a simplified block diagram illustrating a configuration example of a pixel circuit with high dynamic range according to an embodiment with the photoelectric conversion element in high-side configuration.

In FIG. 3A the first supply potential VSUP1 at the reference electrode CintR is a supply reference potential GND, and the second supply potential VSUP2 at the supply electrode of the photoelectric conversion circuit 110 is defined by a positive supply voltage VDD with reference to the supply reference potential GND. The photoelectric conversion circuit 110 is in a high-side configuration with a supply electrode electrically connected to the positive supply voltage VDD. During the integration period Tint, the integration capacitor Cint integrates the photocurrent Iphoto at the storage electrode CintS. The pre-charge potential Vpre can be selected to be negative with respect to the supply reference potential GND.

The output voltage Vout is the effective voltage across the integration capacitor Cint. When the pixel circuit 110 is selected, a controllable pixel output circuit 190 may pass the output voltage Vout as pixel output signal pix_out to a vertical signal line VSL. The pixel output circuit 190 may buffer and/or amplify the output voltage Vout. For example, the pixel output circuit 190 may include an FET in source follower configuration. Alternatively or in addition, the pixel output circuit 190 may include a selection transistor. Alternatively or in addition, the pixel output circuit 190 may include an event detection circuit detecting a change between the current output voltage level against a previous output voltage level.

Figure 3B:
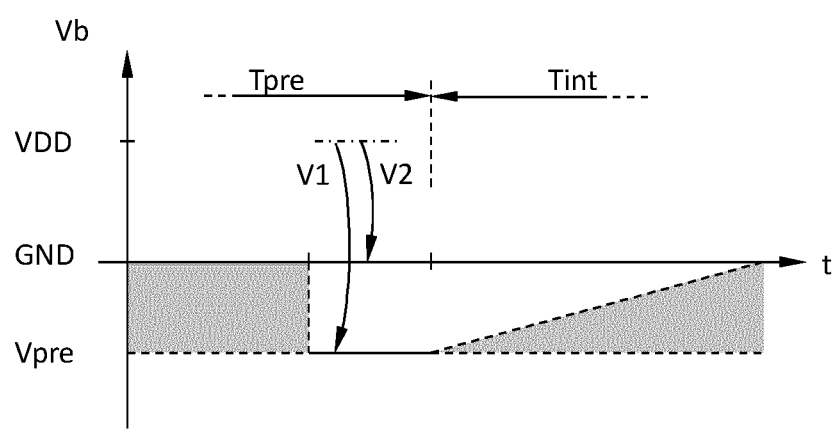
FIG. 3B is a simplified time chart for a voltage at a working node of the pixel circuit of FIG. 3A.

FIG. 3B shows the time chart for the voltage Vb at the working node WN of the pixel circuit 100 in FIG. 3A. Each operation cycle includes a pre-charge period Tpre and an integration period Tint directly following the pre-charge period Tpre.

At the end of the pre-charge period Tpre the voltage Vb at the working node WN is set to the pre-charge voltage Vpre, which can be more negative than the supply reference potential GND.

The supplementary circuit 120 may be configured such that during the integration period Tint the storage electrode CintS is capacitively coupled to the photocurrent Iphoto. In other words, the photocurrent Iphoto may charge/discharge the storage electrode CintS by capacitive coupling. Further components of the supplementary circuit 120 can be decoupled from the integration capacitor Cint in a way that the components of the supplementary circuit 120 do not affect the rise of the voltage Vb at the working node WN within the integration period Tint.

Figure 4A:
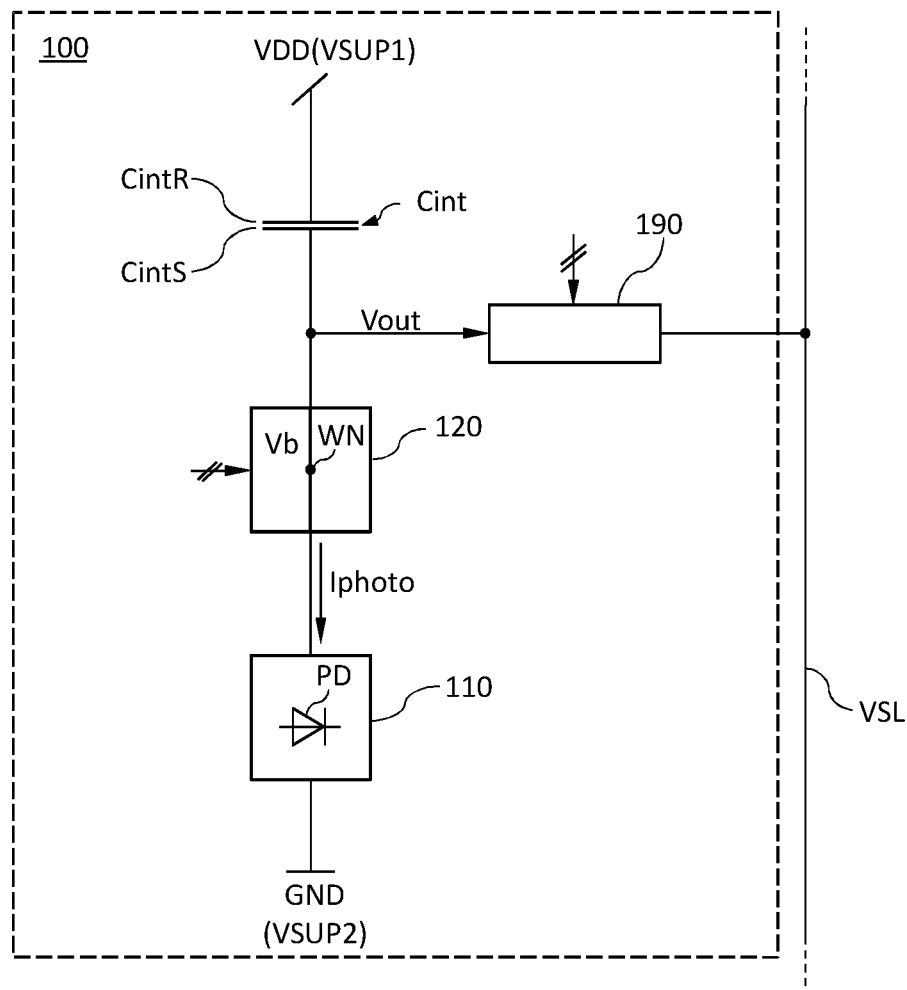
FIG. 4A is a simplified block diagram illustrating a configuration example of a pixel circuit with high dynamic range according to an embodiment with the photoelectric conversion element in low-side configuration.

In FIG. 4A, the second supply potential VSUP2 at the supply electrode of the photoelectric conversion circuit 110 is a supply reference potential GND and the first supply potential VSUP1 at the reference electrode CintR is defined by a positive supply voltage VDD with reference to the supply reference potential GND. The photoelectric conversion circuit 110 is in a low-side configuration with a supply electrode electrically connected to the supply reference potential GND. The photocurrent gradually discharges the storage electrode CintS of the integration capacitor Cint in the integration mode. The pre-charge potential Vpre can be selected to be more positive than the positive supply voltage VDD.

Figure 4B:
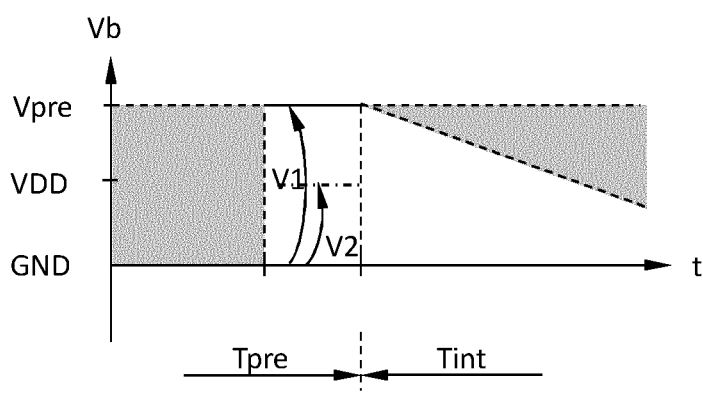
FIG. 4B is a simplified time chart for a voltage at a working node of the pixel circuit of FIG. 4A.

FIG. 4B shows the time chart for the voltage Vb at the working node WN of the pixel circuit 100 in FIG. 4A. At the end of a pre-charge period Tpre the voltage Vb at the working node WN is set to the pre-charge voltage Vpre, which can be more positive than the supply voltage VDD.

The supplementary circuit 120 may pre-charge the working node WN by capacitor switching. In other words, the supplementary circuit 120 may include a switched capacitor circuit including switches and capacitors. Each switch may be an electronic switch, e.g. an n-channel FET, a p-channel FET, or a transfer gate by way of example. Each capacitor may be or may include a parasitic capacitance and/or an explicit capacitor, wherein an explicit capacitor includes at least one electrode formed by a diffusion region, a metal structure, and/or a metal-like semiconductor structure serving no other purpose. A supplementary circuit 120 realized only or mainly by passive elements has only a low adverse effect on power consumption.

An auxiliary control unit may generate and drive one or more supplementary control signals for controlling the supplementary circuit 120.

Referring again to FIG. 1, the auxiliary control unit may be integrated in at least one of the row decoder 12, the row driver, and the control unit 15 of the solid-state imaging device 10. The supplementary control signals may address single supplementary circuits 120, may address all supplementary circuits 120 of the same row at the same time, may address all supplementary circuits 120 of the same column at the same time, or may address the supplementary circuits 120 of all pixel circuits 100 at the same time.

Figure 5A:
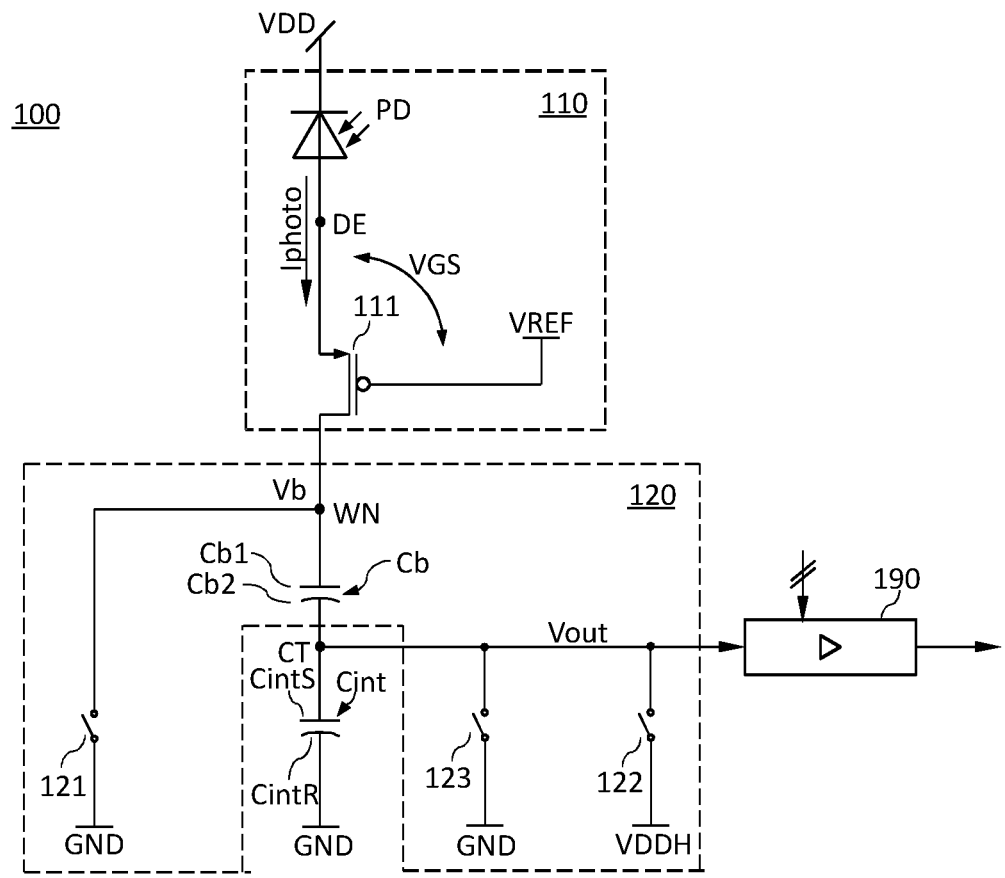
FIG. 5A is a simplified circuit diagram illustrating a configuration example of a pixel circuit with high dynamic range according to an embodiment referring to unbuffered direct injection.
Figure 5B:
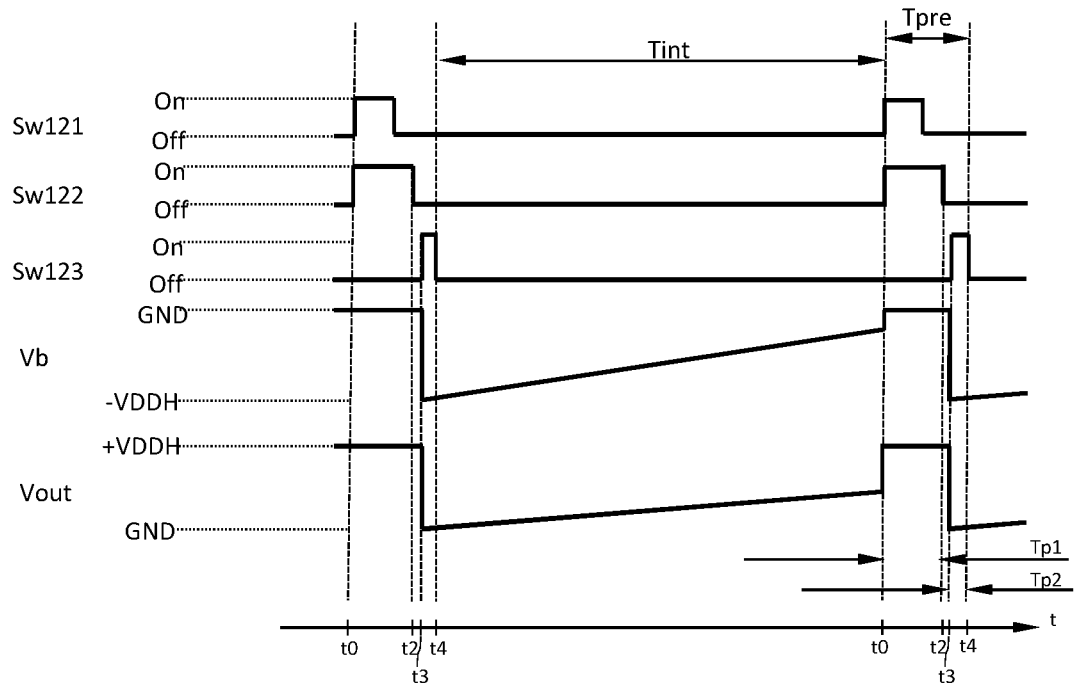
FIG. 5B is a simplified time chart for various voltage signals in the pixel circuit of FIG. 5A.

FIGS. 5A and 5B refer to an embodiment with a pixel circuit 100 of the (unbuffered) direct injection type, wherein the photoelectric conversion circuit 110 is in high-side configuration with the supply electrode connected to the positive supply voltage VDD.

In addition to the photoelectric conversion element PD that converts radiation into a photocurrent Iphoto, the photoelectric conversion circuit 110 includes a buffer transistor 111 with a load path electrically connected in series between the photoelectric conversion element PD and the working node WN.

The channel type of the buffer transistor 111 depends on the configuration of the photoelectric conversion element PD with respect to the integration capacitor Cint and the supply reference potential GND. In the illustrated example, the integration capacitor Cint is between the photoelectric conversion element PD and the supply reference potential GND such that the photoelectric conversion element PD is in a high-side configuration. The buffer transistor 111 is a pFET (p channel field effect transistor). In another example, the photoelectric conversion element PD may be in a low-side configuration with the integration capacitor Cint between the positive supply voltage VDD and the photoelectric conversion element PD. Then the buffer transistor 111 may be an nFET (n channel field effect transistor).

A fixed reference voltage VREF is supplied to the gate of the buffer transistor 111 which operates as current buffer to pass the photocurrent Iphoto to the integration capacitor Cint.

A voltage Vde at a detector node DE between the photoelectric conversion element PD and the load path of the buffer transistor 111 is equal to VREF reduced by the gate-to-source voltage VGS of the buffer transistor 111. As a consequence, the bias across the photoelectric conversion element PD is not constant but depends on light intensity.

On the other hand, the photoelectric conversion circuit 110 is comparatively compact and requires only little space and little electric power.

The supplementary circuit 120 includes an auxiliary capacitor Cb with a first electrode Cb1 and a second electrode Cb2. The first electrode Cb1 is electrically connected to the working node WN. The second electrode Cb2 of the auxiliary capacitor and the storage electrode CintS of the integration capacitor Cint are electrically connected to a center tap node CT. With the auxiliary capacitor Cb between the photoelectric conversion circuit 110 and the integration capacitor Cint, it is possible to shift the voltage swing at the working node WN with respect to the voltage swing for the output voltage Vout, which drops between the center tap node CT and the supply reference potential GND.

The supplementary circuit 120 may be configured to pre-charge the working node WN by successively pre-charging, with the working node WN connected to the first supply potential VSUP1 (e.g. supply reference potential GND), the center tap node with a tap potential, and connecting, with the working node WN disconnected from the first supply potential VSUP1 (e.g., GND) the center tap node CT to the first supply potential VSUP1 (e.g., GND). The tap potential may be positive with respect to the supply reference potential GND.

The tap potential may correspond to the positive supply voltage VDD at the supply electrode of the photoelectric conversion element PD or may correspond to a positive first auxiliary voltage VDDH that may be higher or lower than the positive supply voltage VDD at the supply electrode of the photoelectric conversion element PD.

The pre-charging of the center tap node CT with the tap potential generates a positive voltage across the auxiliary capacitor Cb in direction from the center tap node CT to the working node WN, which at the same time is on supply reference potential GND. By separating the working node WN from the supply reference potential GND and instead connecting the center tap node CT to the supply reference potential GND, the potential Vb at the working node is shifted to a potential lower than the supply reference potential GND by the tap potential and at the same time the output voltage Vout is initialized with the supply reference potential GND.

The supplementary circuit 120 may include a first switch 121 configured to electrically connect the working node WN and the reference electrode CintR in a first phase Tp1 of the pre-charge period Tpre, when the auxiliary capacitor Cb is charged with the center tap potential.

The first switch 121 is open in a second phase Tp2 of the pre-charge period Tpre when the reference potential for the auxiliary capacitor Cb is shifted. The first switch 121 is also open in the integration period Tint.

The supplementary circuit 120 may include a second switch 122 configured to electrically connect the center tap node CT to the second supply potential VSUP2 in the first phase Tp1 of the pre-charge period. The second switch 122 is open in the second phase Tp2 of the pre-charge period Tpre, when the reference for the auxiliary capacitor Cb is shifted. The second switch 122 is also open in the integration period Tint.

The supplementary circuit 120 may include a third switch 123 configured to electrically connect the center tap node CT to the first supply potential VSUP1 in the second phase Tp2 of the pre-charge period Tpre.

The third switch 123 is open in the first phase Tp1 of the pre-charge period and in the integration period.

The start of the second phase Tp2 may be slightly delayed with respect to the end of the first phase Tp1, in particular against the turn-off of the first switch 121. In particular, a transition phase may separate the first phase Tp1 and the second phase Tp2, wherein the transition phase separates the switching edges of the first, second and third switches 121, 122.

FIG. 5B shows some signals for the pixel circuit 100 of FIG. 5A. Each operation cycle of the pixel circuit 100 includes a pre-charge period Tpre and an integration period Tint that may directly follow the pre-charge period Tpre.

A first phase Tp1 of the pre-charge period Tpre starts at t=t0. The first switch 121 and the second switch 122 are "on". The third switch 123 is "off". The potential Vb at the working node WN is set to the supply reference potential GND. The output voltage Vout between the storage electrode CintS and the supply reference potential GND is set to the first auxiliary voltage VDDH. The first phase Tp1 ends at t=t2.

A second phase Tp2 of the pre-charge period Tpre starts at t=t3. The first switch 121 and the second switch 122 are "off". The third switch 123 is "on". The potential Vb at the working node WN is shifted to below the supply reference potential by the first auxiliary voltage VDDH. The output voltage Vout between the storage electrode CintS and the supply reference potential GND is set to 0V.

The integration period Tint starts at t=t4 and ends at t=t0 of the next pre-charge period Tpre. The first switch 121, the second switch 122, and the third switch are "off". The equivalent capacitance at the working node WN is equal to Cint//Cb. The capacitance of Vout is equal to Cint. By accumulating the photocurrent with the effective capacitance, the voltage Vb between the wording node WN and the supply reference potential GND steadily increases starting from Vb=−VDDH. Accordingly the output voltage Vout steadily increases starting from Vout=0V. Since the equivalent capacitance Cint//Cb at the working node WN is smaller than the capacitance of the integration capacitor Cint, the Vb slew rate is higher than the Vout slew rate. The output voltage Vout at the end of the integration period Tint is equal to (Iphoto*Tint)/Cint.

A capacitance of the auxiliary capacitor Cb may be approximately in same order of magnitude as the capacitance of the integration capacitor Cint. For example, the capacitance of the auxiliary capacitor Cb may be lower than the capacitance of the integration capacitor Cint. According to another example, the capacitance of the auxiliary capacitor Cb may be at least 10% or at least 50% of the capacitance of the integration capacitor Cint.

For a supply voltage VDD greater 2.0V, the capacitance of the auxiliary capacitor Cb may be at least as high as the capacitance of the integration capacitor Cint, e.g. at least twice as high.

For a supply voltage VDD below 1.2V, the capacitance of the auxiliary capacitor Cb may be at least 50% the capacitance of the integration capacitor Cint, e.g. at least as high as the capacitance of the integration capacitor Cint.

The output voltage Vout voltage swing increases with increasing capacitance of the auxiliary capacitor Cb. At the same time, the capacitance of the integration capacitor Cint can be kept small and noise resulting from the integration capacitor Cint remains small.

Figure 6A:
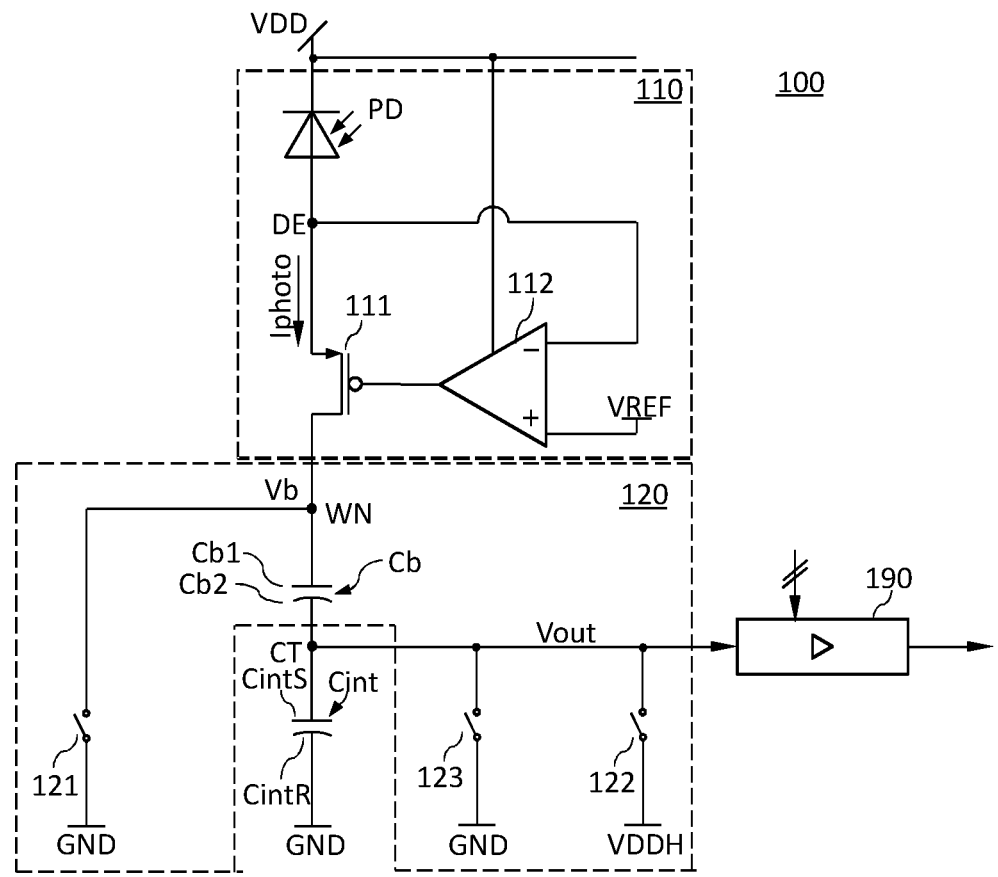
FIG. 6A is a simplified circuit diagram illustrating a configuration example of a pixel circuit with high dynamic range according to an embodiment referring to buffered direct injection (BDI) and with the photoelectric conversion element in high-side configuration.
Figure 6B:
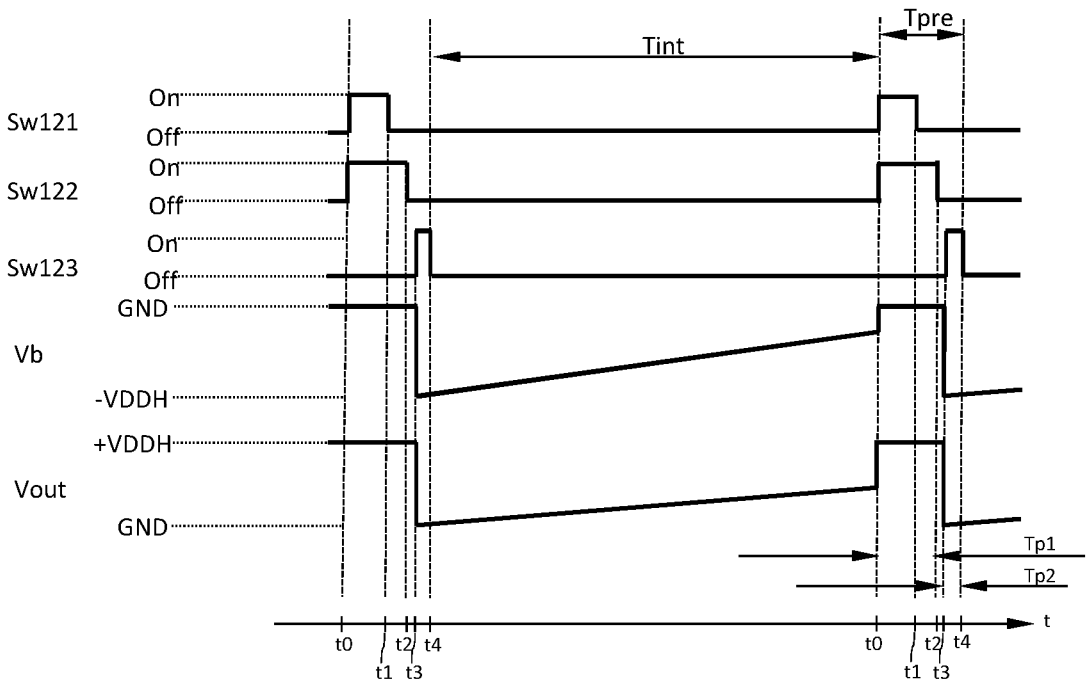
FIG. 6B is a simplified time chart for various voltage signals in the pixel circuit of FIG. 6A.

FIGS. 6A and 6B refer to buffered direct injection with the photoelectric conversion circuit 110 in high-side configuration.

The photoelectric conversion circuit 110 further includes an amplifier circuit 112 that controls the buffer transistor 111 to keep a bias voltage across the photoelectric conversion element PD constant for different photocurrents.

In particular, an inverting input of the amplifier circuit 112 may be electrically connected to an output of the photoelectric conversion element PD, a non-inverting input of the amplifier circuit 112 may be electrically connected to a reference voltage node VREF and an output of the amplifier circuit 112 controls the buffer transistor 111. The amplifier circuit 112 may be or may include an operational amplifier.

In particular, by zeroing the input voltage between the inverting input and the non-inverting input, the amplifier circuit 112 biases the detector node DE between the photoelectric conversion element PD and the buffer transistor 111 via the virtual ground with the reference voltage VREF applied to the non-inverting input.

The time chart illustrated in FIG. 6B differs from the time chart in FIG. 5B in that the first phase Tp1 of the pre-charge period Tpre ends when the first switch 121 turns off at t=t1. In a transition phase separating the first phase Tp1 and the second phase Tp2 of the pre-charge period Tpre, the second switch 122 turns off at t=t2 after the first switch 121 has turned off and before the third switch 123 turns on at t=t3. The integration period Tint starts at t=t4 when the third switch 123 turns off.

Figure 7A:
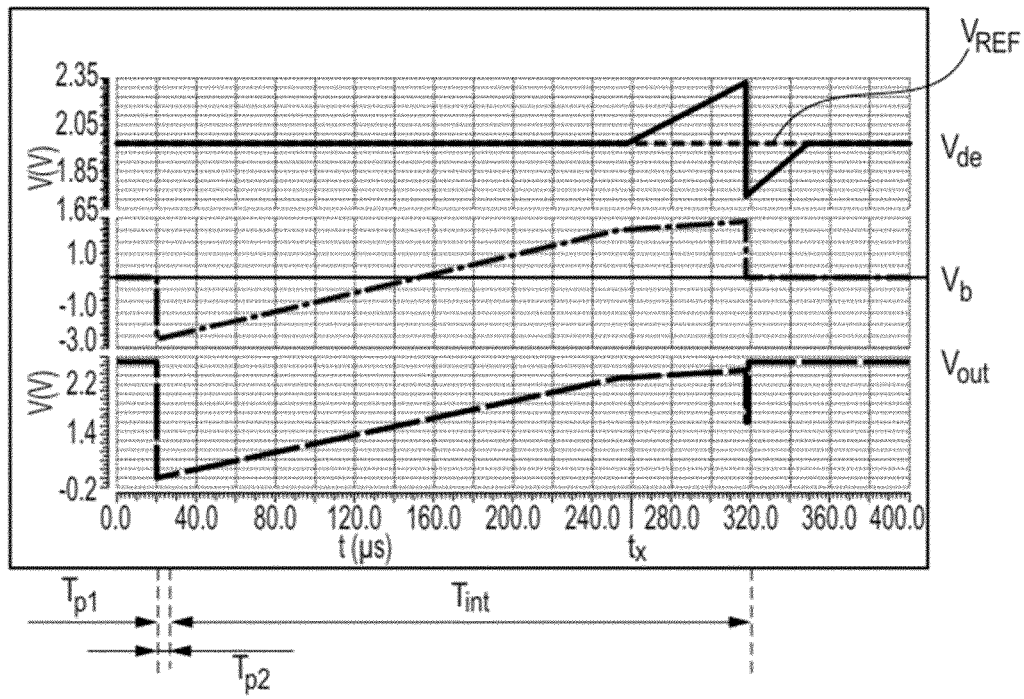
FIGS. 7A and 7B are further time charts for various voltage signals in the pixel circuit of FIG. 6A.
Figure 7B:
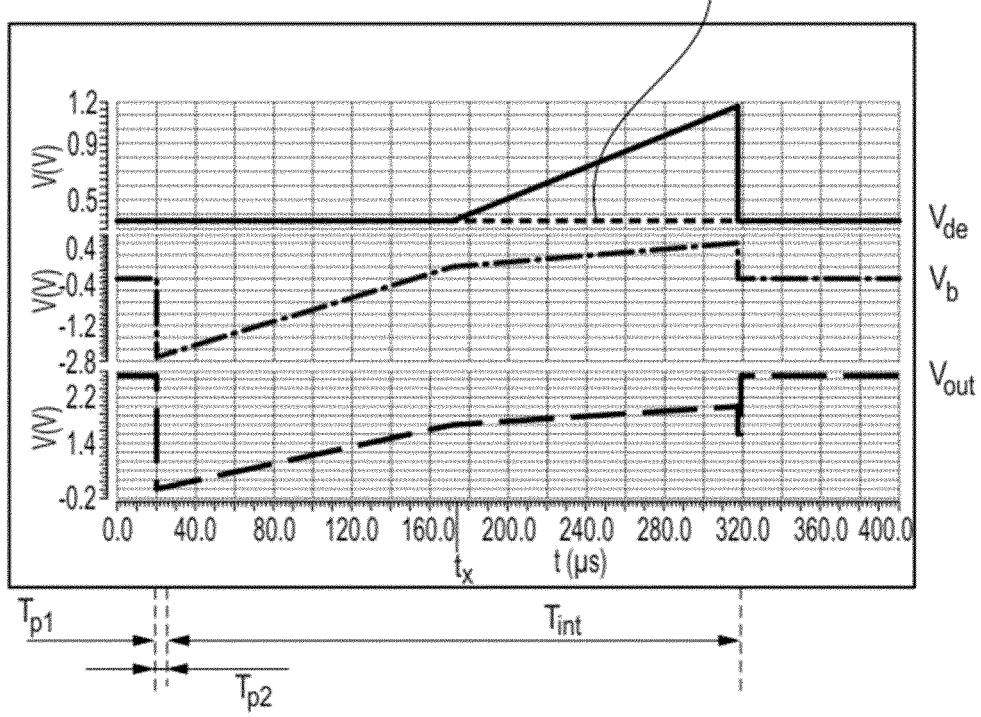

Each of FIGS. 7A and 7B shows the voltage Vde at the detector node DE, the voltage Vb at the working node WN and the output voltage Vout for a pixel circuit 100 as illustrated in FIG. 6A. The voltage reference VREF is selected such that a voltage across the reverse-biased photoelectric conversion element PD is 0.7V. The capacitance of the integration capacitor Cint is equal 10 fF. The capacitance of the auxiliary capacitor Cb is equal 10 fF. The photoelectric conversion element PD is irradiated at constant light intensity.

In FIG. 7A the supply voltage VDD is 2.7V. During the first phase Tp1 of the pre-charge period Tpre, the voltage Vb at the working node WN is 0V and the output voltage is approximately 2.7V. At the end of the second phase Tp2 of the pre-charge period Tpre, the voltage Vb at the working node WN is approximately −2.7V and the output voltage is 0V.

As long as the combination of buffer transistor 111 and amplifier circuit 112 works properly within a predefined operating range, the voltage at the detector node DE is held at approximately 2V.

With start of the integration period Tint, the voltages Vb and Vout start to rise. At t=tX the voltage Vb at the working node reaches a level at which the buffer transistor 111 is no longer saturated such that the voltage at the detector node cannot longer be held at 2V. The bias across the photoelectric conversion element PD decreases and the detector node and the working node WN become increasingly shorted. The voltages Vb at the working node WN and the output voltage Vout increase at a reduced rate.

The output voltage Vout at t=tX is about 2.3 V. The total voltage swing is about 2.3V.

In FIG. 7B the supply voltage VDD is 1.05V. Accordingly, during the first phase Tp1 of the pre-charge period Tpre, the voltage Vb at the working node WN is about 0V and the output voltage Vout is approximately 1.05V. At the end of the second phase Tp2 of the pre-charge period Tpre, the voltage Vb at the working node WN is approximately −1.05V and the output voltage is about 0V.

As long as the combination of buffer transistor 111 and amplifier circuit 112 works properly within a predefined operating range, the voltage at the detector node DE is held at 0.35V.

When at t=tX the voltage Vb at the working node reaches a level at which the combination of buffer transistor 111 and amplifier circuit 112 cannot longer hold the voltage at the detector node at 0.35V, the output voltage Vout is approximately 2.3V. The total voltage swing is approximately 1.5V.

Figure 8A:
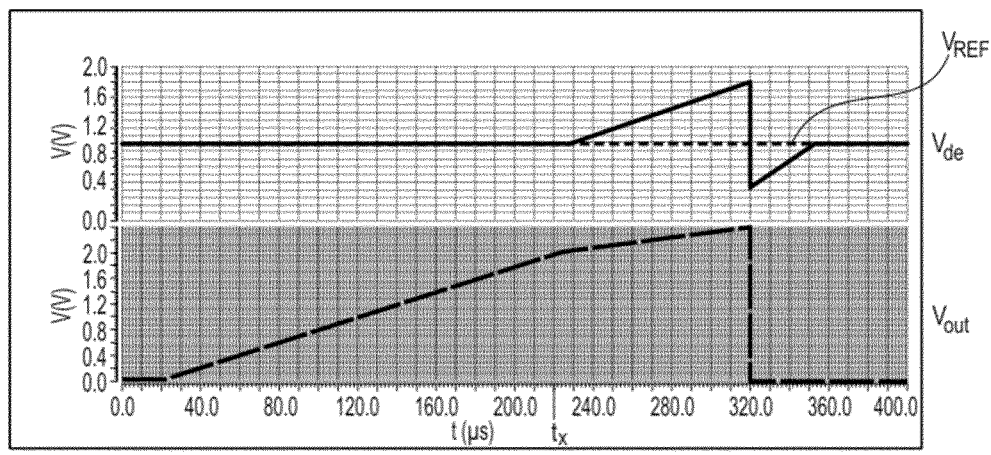
FIGS. 8A and 8B are time charts for various voltage signals in a comparative pixel circuit for discussing effects of the embodiments.
Figure 8B:
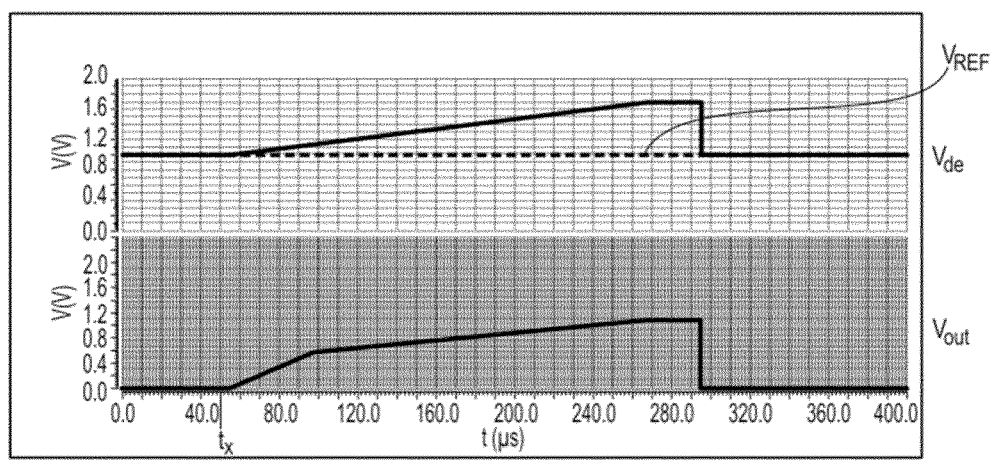

Each of FIGS. 8A and 8B shows the voltage Vde at the detector node DE and the output voltage Vout for a comparative pixel circuit which differs from the pixel circuit 100 of FIG. 6A in that a direct connection between the storage electrode CintS of the integration capacitor Cint and the working node WN replaces the auxiliary capacitor Cb and in that a single switch short-circuits the electrodes of the integration capacitor Cint in the pre-charge period Tpre. The voltage reference VREF is selected such that voltage across the photoelectric conversion element PD is 0.7V. The capacitance of the integration capacitor Cint is 10 fF. The photoelectric conversion element PD is irradiated at constant light intensity.

In FIG. 8A the supply voltage VDD is 2.7V. The output voltage Vout at t=tX is approximately 2.0V. The total voltage swing is approximately 2.0V.

In FIG. 8B the supply voltage VDD is 1.05V. The output voltage Vout at t=tX is approximately 0.35V. The total voltage swing is approximately 0.35V.

For a supply voltage VDD of 2.7V the supplementary circuit 120 increases the output voltage swing by about 15%. For a supply voltage VDD of 1.05V the supplementary circuit 120 increases the output voltage swing by about 400%. At the same time, the capacitance of the integration capacitor Cint can be kept small Since noise increases with the size of the integration capacitor Cint, compared to a solution aiming at increasing the dynamic range by increasing the capacitance of the integration capacitor Cint, the supplementary circuit 120 does not or only to a lower degree increase the noise level.

Figure 9A:
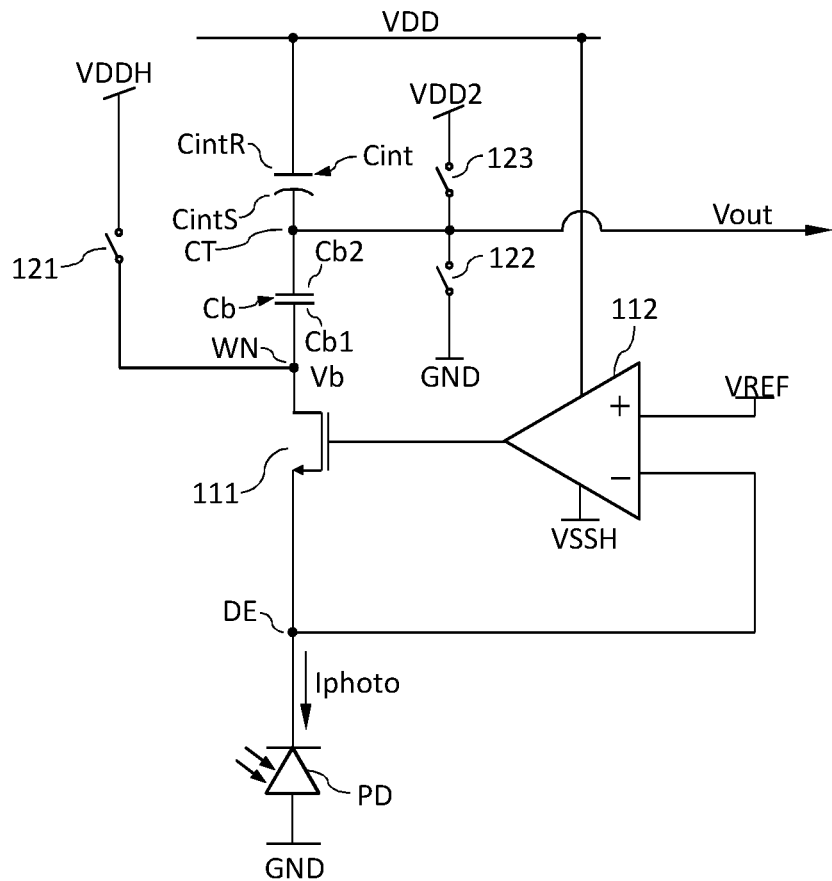
FIG. 9A is a simplified circuit diagram illustrating a configuration example of a pixel circuit with high dynamic range according to an embodiment referring to BDI and with the photoelectric conversion element in low-side configuration.
Figure 9B:
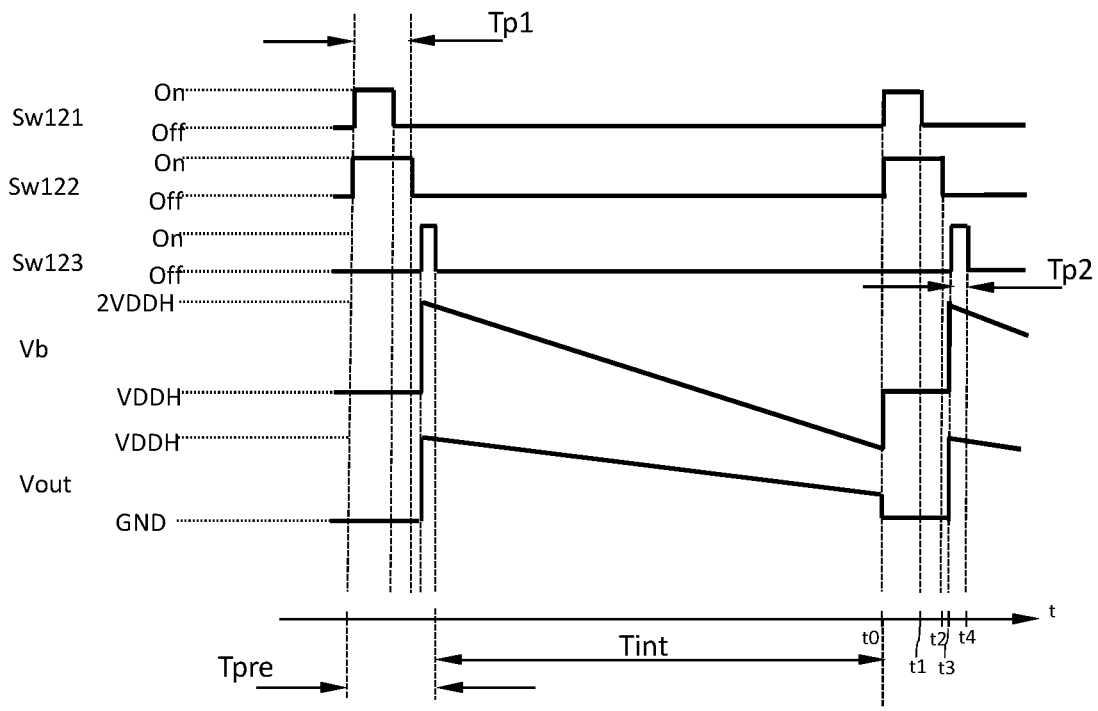
FIG. 9B is a simplified time chart for various voltage signals in the pixel circuit of FIG. 9A.

FIGS. 9A and 9B refer to buffered direct injection with the photoelectric conversion circuit 110 in low-side configuration, wherein a supply electrode of the photoelectric conversion circuit 110 is electrically connected to the supply reference potential GND.

The buffer transistor 111 is an nFET. The amplifier circuit 112 controls the buffer transistor 111 to keep a reverse bias voltage across the photoelectric conversion element PD constant for different photocurrent values. The reverse bias voltage may depend on type and material of the photoelectric conversion element PD and may be approximately 0.7V for a silicon photodiode, by way of example.

The reference electrode CintR of the integration capacitor Cint is electrically connected to the positive supply voltage VDD.

The supplementary circuit 120 includes an auxiliary capacitor Cb with a first electrode Cb1 and a second electrode Cb2. The first electrode Cb1 is electrically connected to the working node WN. The second electrode Cb2 of the auxiliary capacitor Cb and the storage electrode CintS of the integration capacitor Cint are electrically connected to a center tap node CT.

The supplementary circuit 120 may be configured to pre-charge the working node WN by successively pre-charging, with the working node WN connected to a positive first auxiliary voltage VDDH, the center tap node CT with the supply reference potential, and then connecting, with the working node WN floating, the center tap node CT to a positive second auxiliary voltage VDD2. The first and second positive auxiliary voltages VDDH, VDD2 may be equal. At least one of the first and second positive auxiliary voltages VDDH, VDD2 may differ from the positive supply voltage VDD.

A first switch 121 electrically connects the working node WN to the positive first auxiliary voltage VDDH in a first phase Tp1 of the pre-charge period Tpre, when the auxiliary capacitor Cb is pre-charged with the positive first auxiliary voltage VDDH.

The first switch 121 is open in a second phase Tp2 of the pre-charge period Tpre when the reference potential for the auxiliary capacitor Cb is shifted. The first switch 121 is also open during the integration period Tint.

A second switch 122 electrically connects the center tap node CT to the supply reference potential GND in the first phase Tp1 of the pre-charge period Tpre. The second switch 122 is open in the second phase Tp2 of the pre-charge period Tpre, when the reference for the auxiliary capacitor Cb is shifted. The second switch 122 is also open in the integration period Tpre.

A third switch 123 electrically connects the center tap node CT to the positive second auxiliary voltage VDD2 in the second phase Tp2 of the pre-charge period Tpre. The third switch 123 is open in the first phase Tp1 of the pre-charge period Tpre and during the integration period Tint.

FIG. 9B shows some signals for the pixel circuit 100 of FIG. 9A for the case that the first and second auxiliary voltages VDDH and VDD2 are equal (VDD2=VDDH).

Each operation cycle of the pixel circuit 100 includes a pre-charge period Tpre and an integration period Tint that may directly follow the pre-charge period Tpre.

A first phase Tp1 of the pre-charge period Tpre starts at t=t0. The first switch 121 and the second switch 122 are "on". The third switch 123 is "off". The potential Vb at the working node WN is set by the positive first auxiliary voltage VDDH. The output voltage Vout between the storage electrode CintS and the supply reference potential GND is 0V.

A second phase Tp2 of the pre-charge period Tpre starts at t=t3. The first switch 121 and the second switch 122 are "off". The third switch 123 is "on". The potential Vb at the working node WN is increased by the positive second auxiliary voltage VDD2. With the first and second auxiliary voltages VDDH and VDD2 being equal, the potential Vb at the working node WN increases to 2*VDDH and the output voltage Vout between the storage electrode CintS and the supply reference potential GND is set equal to the first auxiliary voltage VDDH.

The integration period Tint starts at t=t4 and ends at t=t0 of the next pre-charge period Tpre. The first switch 121, the second switch 122, and the third switch are "off". The equivalent capacitance at the working node WN is equal to Cint//Cb. The capacitance of Vout is equal to Cint. By integrating the photocurrent with the effective capacitance, the voltage Vb between the wording node WN and the supply reference potential GND steadily decreases starting from Vb=2*VDDH. Accordingly the output voltage Vout steadily decreases starting from Vout=VDDH. The output voltage Vout at the end of the integration period Tint changes by an amount that is equal to (Iphoto*Tint)/Cint.

Figure 10:
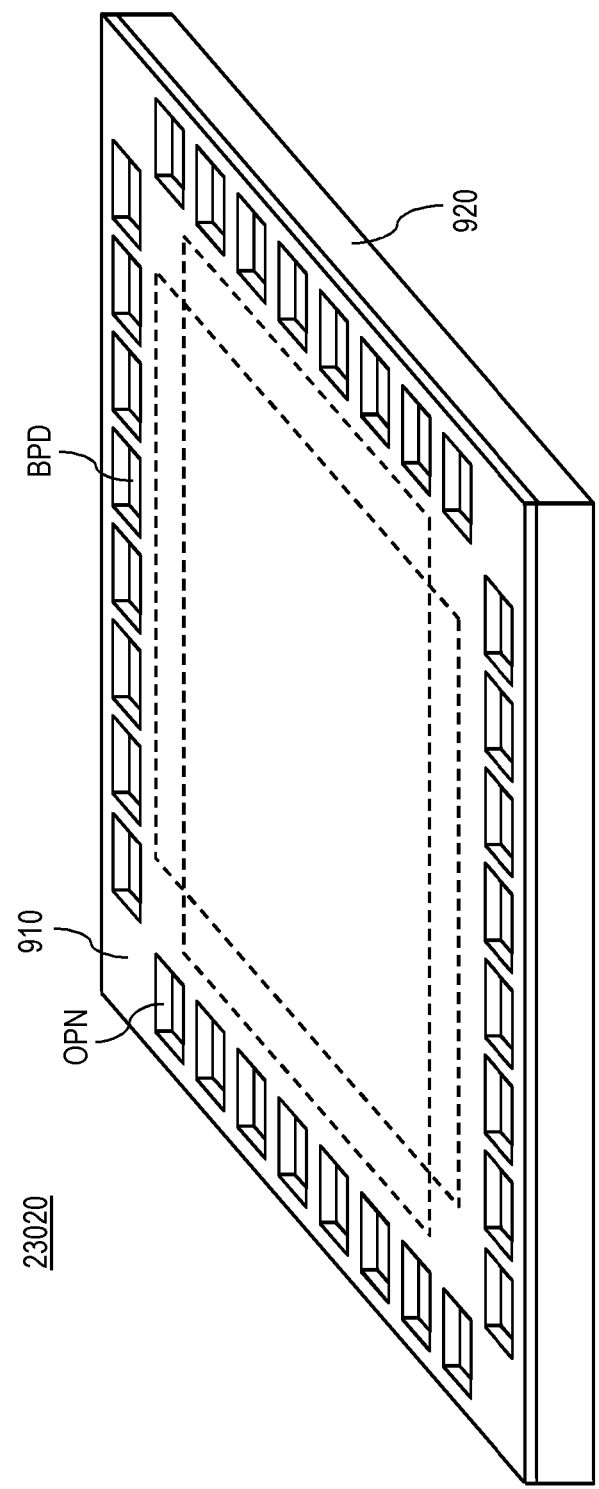
FIG. 10 is a diagram showing an example of a laminated structure of a solid-state imaging device according to an embodiment of the present disclosure.

FIG. 10 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include, in addition to the photoelectric conversion elements, at least the buffer transistor, the integration capacitor and/or the auxiliary transistor of the pixel circuits. Alternatively, the first chip 910 may include each element of the pixel circuit.

The second chip 920 may be mainly a logic chip (digital chip) that includes the elements complementing the elements on the first chip 910 to complete pixel circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 11:
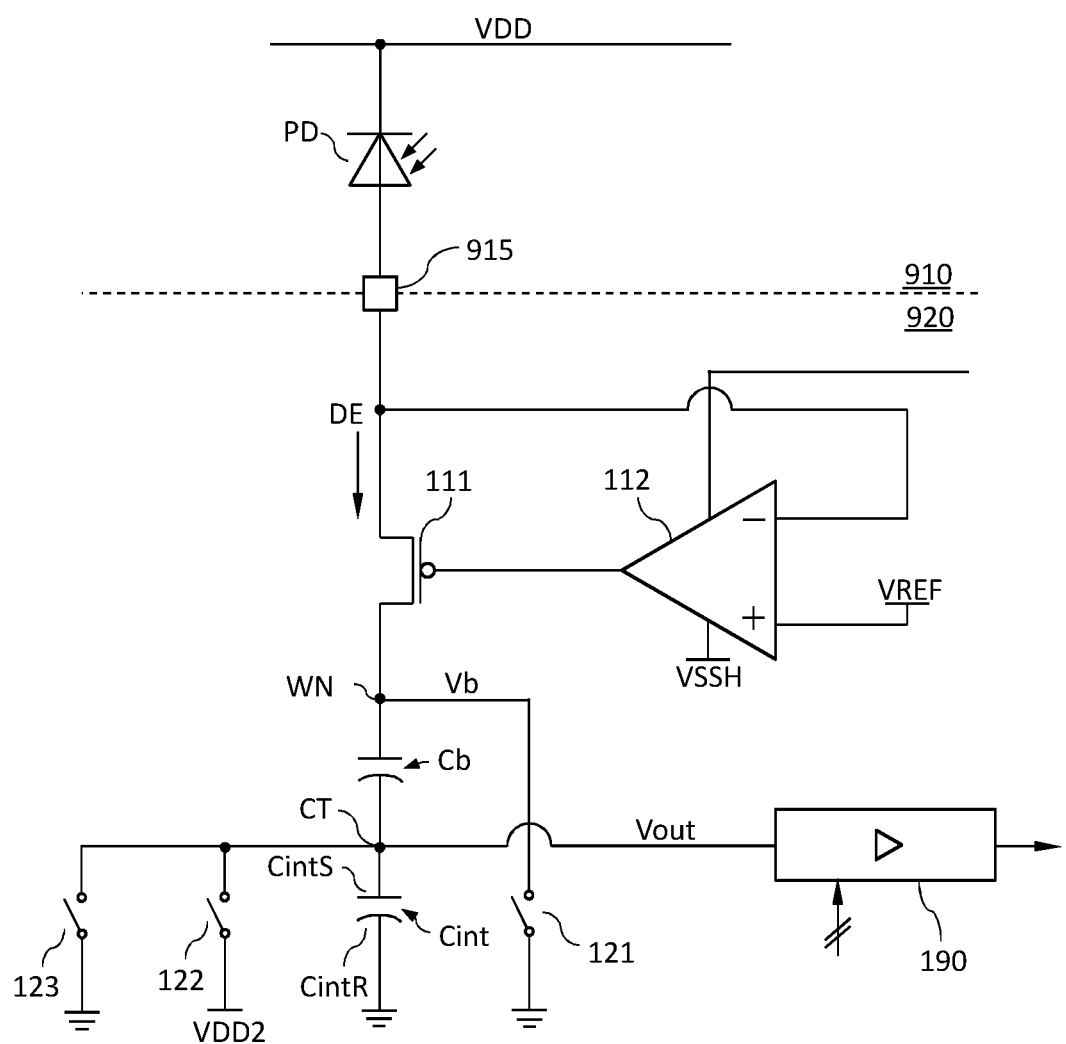
FIG. 11 is a simplified circuit diagram illustrating a configuration example of a pixel circuit with high dynamic range according to an embodiment referring to solid-state imaging devices with laminated structure.

FIG. 11 shows a possible allocation of elements of a BDI pixel circuit 100 across the first chip 910 and the second chip 920 of FIG. 10.

The first chip 910 includes the photoelectric conversion element PD which is in high-side configuration. The second chip 920 includes the p-channel buffer transistor 111 and the amplifier circuit 112 of the photoelectric conversion element PD, the supplementary circuit 120 and the pixel output circuit 190. One through contact via 915 per pixel circuit 100 passes the detector signal from the first chip 910 to the second chip 920.

Typically, the first chip 910 includes a p-type substrate and formation of p-channel MOSFETs may imply the formation of n-doped wells separating the p-type source and drain regions of the p-channel MOSFETs from each other and from further p-type regions. Avoiding the formation of p-channel MOSFETs may therefore simplify the manufacturing process of the first chip 910. By forming the photoelectric conversion element PD on the first chip 910 it is also possible to form the photoelectric conversion element PD from a semiconductor material other than the semiconductor material used for the other elements of the pixel circuit 100.

Figure 12:
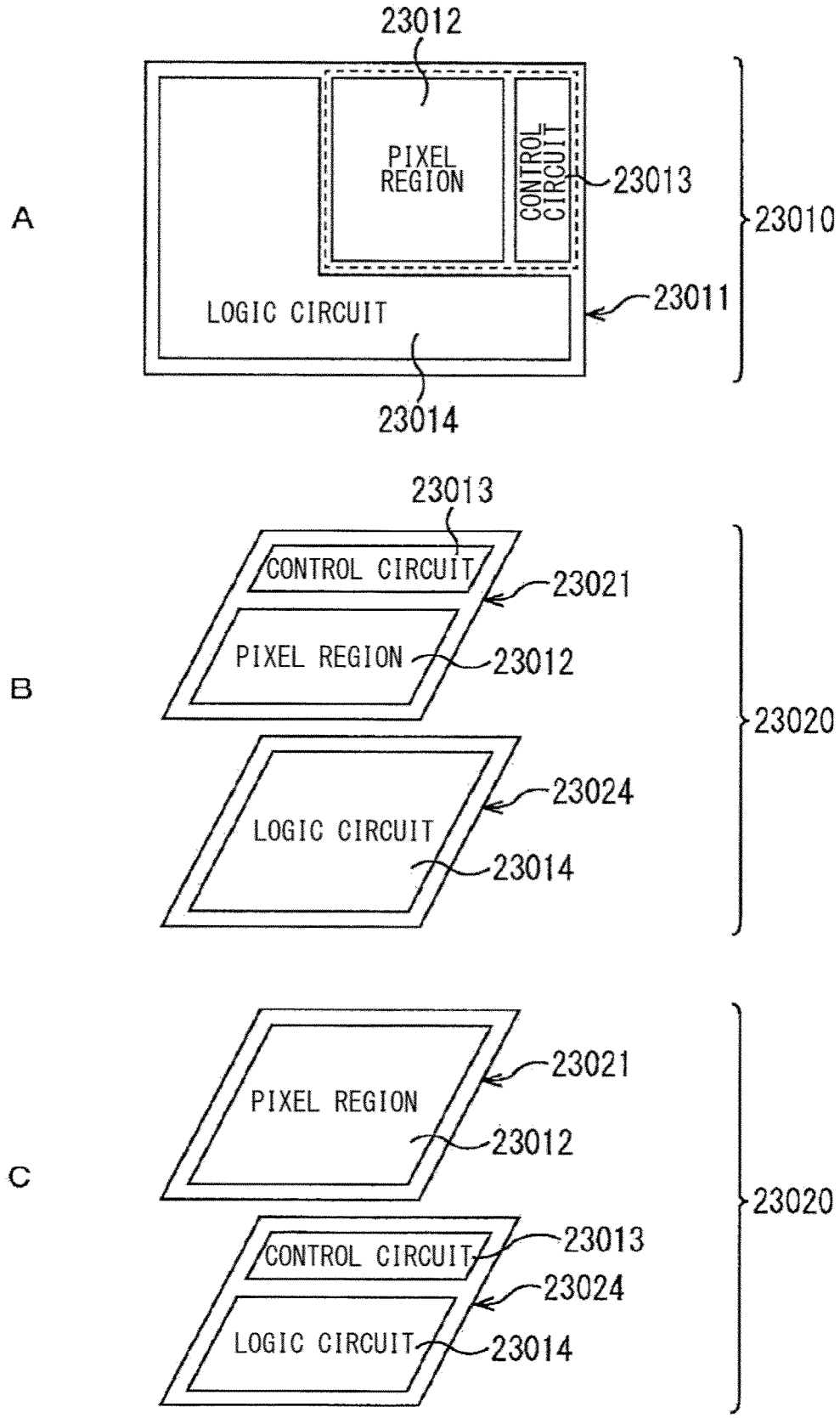
FIG. 12 illustrates an overview of a configuration example of a multi-layer solid-state imaging device to which a technology according to the present disclosure may be applied.

FIG. 12 illustrates schematic configuration examples of solid-state imaging devices 23010, 23020.

The single-layer solid-state imaging device 23010 illustrated in part A of FIG. 12 includes a single die (semiconductor substrate) 23011. Mounted and/or formed on the single die 23011 are a pixel region 23012 (photoelectric conversion elements), a control circuit 23013 (readout circuit, threshold controller), and a logic circuit 23014 (parts of pixel circuits, row driver). In the pixel region 23012, pixels are disposed in an array form. The control circuit 23013 performs various kinds of control including control of driving the pixels. The logic circuit 23014 performs signal processing.

Parts B and C of FIG. 12 illustrate schematic configuration examples of multi-layer solid-state imaging devices 23020 with laminated structure. As illustrated in parts B and C of FIG. 12, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 12, the pixel region 23012 and the control circuit 23013 are formed or mounted on the sensor die 23021, and the logic circuit 23014 is formed or mounted on the logic die 23024. The logic circuit 23014 may include at least parts of the pixel circuits as described with reference to the preceding FIGS. The pixel region 23012 includes at least the photoelectric conversion elements.

With reference to part C of FIG. 12, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Figure 13:
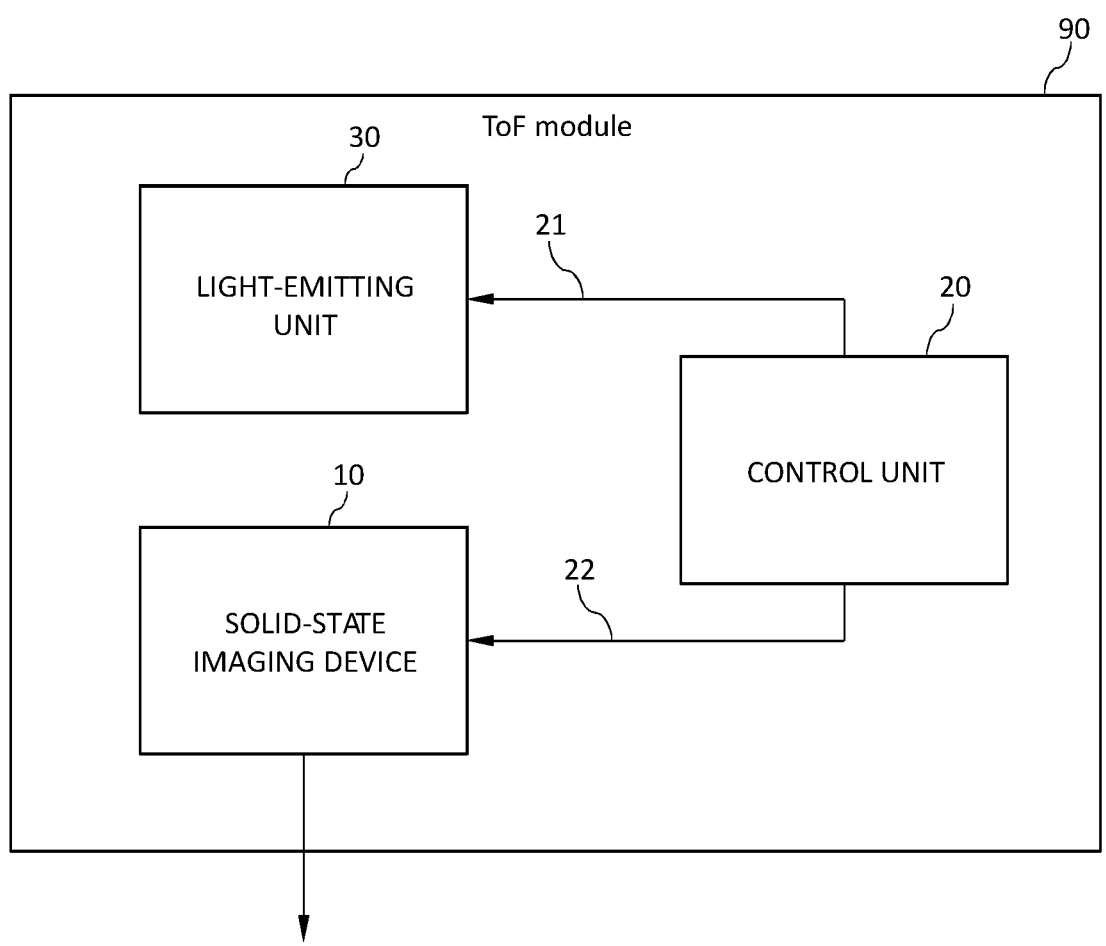
FIG. 13 is a block diagram depicting an example of a schematic configuration of a time-of-flight information acquisition system.

FIG. 13 is a block diagram illustrating a configuration example of a ToF (time-of-flight) module 90 according to this embodiment of the present technology. The ToF module 90 may be an electronic apparatus that measures a distance by a time of flight method, and includes a light-emitting unit 30, a control unit 20, and a solid-state imaging device 10 with pixel circuits as described in the preceding FIGS.

The light-emitting unit 30 intermittently emits irradiation light to irradiate an object with the irradiation light. For example, the light-emitting unit 30 generates irradiation light in synchronization with a light-emission control signal of a rectangular wave. In addition, the light-emitting unit 30 may include a photodiode, and near infrared light and the like can be used as the irradiation light. Furthermore, the light-emission control signal is not limited to the rectangular wave as long as the light-emission control signal is a periodic signal. For example, the light-emission control signal may be a sinusoidal wave. In addition, the irradiation light may be visible light and the like without limitation to near infrared light.

The control unit 20 controls the light-emitting unit 30 and the solid-state imaging device 10. The control unit 20 generates the light-emission control signal and may supply the light-emission control signal to the light-emitting unit 30 and the solid-state imaging device 10 through signal lines 21 and 22. For example, a frequency of the light-emission control signal may be 20 megahertz (MHz). Furthermore, the frequency of the light-emission control signal may be 5 megahertz (MHz) and the like without limitation to 20 megahertz (MHz).

The solid-state imaging device 10 receives reflected light of the intermittent irradiation light and measures a distance from an object by the ToF method. The solid-state imaging device 10 may generate distance measurement data indicating a measured distance and may output the distance measurement data to an outer side. With the solid-state imaging device 10 including pixel circuits as described with reference to the preceding figures, the ToF module combines high dynamic range and low power consumption.

Figure 14:
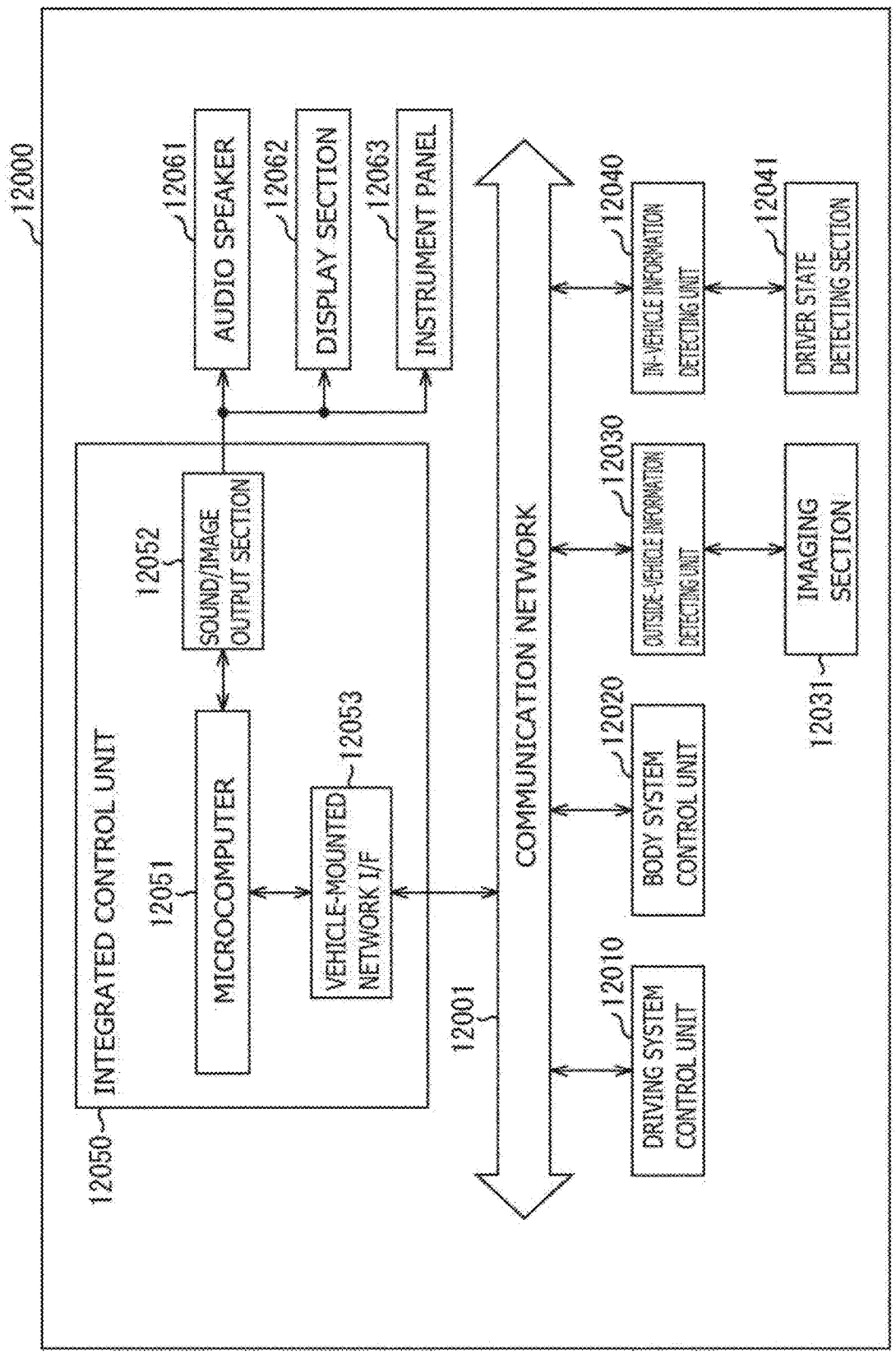
FIG. 14 is a block diagram depicting an example of a schematic configuration of a vehicle control system.

FIG. 14 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 14, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging device with pixel circuits according to the embodiments of the present disclosure. In particular, with the solid-state imaging device 10 including the pixel circuits as described with reference to the preceding figures, the imaging section 12031 combines high dynamic range and low power consumption. The light received by the imaging section 12031 may be visible light, or may be invisible light such as infrared rays or the like.

The in-vehicle information detecting unit 12040 detects information about the inside of the vehicle and may be or may include a solid-state imaging device and with pixel circuits according to the embodiments of the present disclosure. The in-vehicle information detecting unit 12040 is, for example, connected with a driver state detecting section 12041 that detects the state of a driver. The driver state detecting section 12041, for example, includes a camera that includes the solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 14, an audio speaker 12061, a display section 12062, and an instrument panel 12063 are illustrated as the output device. The display section 12062 may, for example, include at least one of an on-board display or a head-up display.

Figure 15:
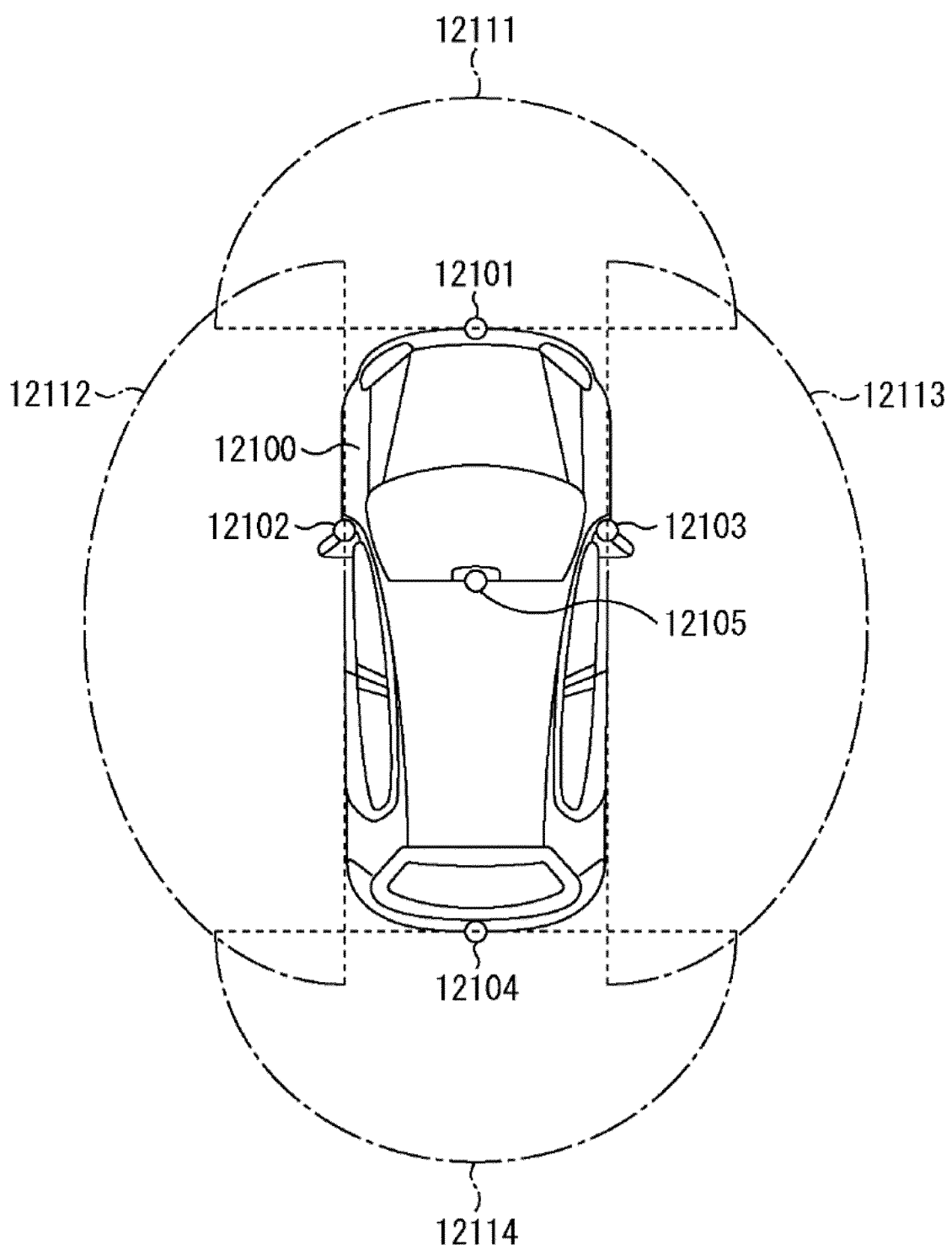
FIG. 15 is a diagram of assistance in explaining an example of installation positions of an outside-vehicle information detecting section and an imaging section of the vehicle control system of FIG. 14.

FIG. 15 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 15 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including a solid-state imaging device according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the pixel circuits according to the embodiments the dynamic range of the sensors, and the intensity resolution of the sensors can be enhanced.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A pixel circuit, including:
    a photoelectric conversion circuit configured to generate and output a photocurrent;

an integration capacitor including a storage electrode and a reference electrode, wherein the reference electrode is connected to a first supply potential, and wherein the integration capacitor is configured to integrate the photocurrent on the storage electrode in an integration period; and a supplementary circuit configured to pre-charge a working node between the photoelectric conversion circuit and the storage electrode to a pre-charge potential different from the first supply potential (2) The pixel circuit according to (1),
wherein the pre-charge potential is selected such that a first potential difference between a second supply potential at a supply electrode of the photoelectric conversion circuit and the pre-charge potential is greater than a second potential difference between the second supply potential and the first supply potential.

(3) The pixel circuit according to any of (1) and (2),
wherein the supplementary circuit is configured such that the storage electrode is capacitively coupled to the photocurrent during the integration period.

(4) The pixel circuit according to any of (1) to (3),
wherein the supplementary circuit is configured to pre-charge the working node by capacitor switching.

(5) The pixel circuit according to any of (1) to (4),
wherein the supplementary circuit includes an auxiliary capacitor including a first electrode and a second electrode, wherein the first electrode is electrically connected to the working node, and wherein the second electrode and the storage electrode of the integration capacitor are electrically connected to a center tap node.

(6) The pixel circuit according to (5),
wherein the supplementary circuit is configured to pre-charge the working node by successively (i) pre-charging, with the working node connected to the first supply voltage, the center tap node with a tap potential, and then connecting, with the working node disconnected from the first supply voltage, the center tap node to the first supply voltage.

(7) The pixel circuit according to any of (5) and (6),
wherein the supplementary circuit includes a first switch configured to electrically connect the working node and the reference electrode in a first phase of a pre-charge period.

(8) The pixel circuit according to any of (5) to (7),
wherein the supplementary circuit includes a second switch configured to electrically connect the center tap node to a second supply voltage in the first phase of the pre-charge period.

(9) The pixel circuit according to any of (5) to (8),
wherein the supplementary circuit includes a third switch configured to electrically connect the center tap node to the first supply voltage in a second phase of the pre-charge period.

(10) The pixel circuit according to (7) and (9),
wherein the supplementary circuit is configured to turn on the third switch after a delay with regard to a turn off of the first switch.

(11) The pixel circuit according to any of (1) to (10),
wherein the photoelectric conversion circuit includes a photoelectric conversion element configured to convert radiation into the photocurrent, and a buffer transistor with a load path electrically connected in series between the photoelectric conversion element and the working node.

(12) The pixel circuit according to (11), wherein the photoelectric conversion circuit further includes an amplifier circuit configured to control the buffer transistor to keep a bias voltage across the photoelectric conversion element constant for different photocurrents.

(13) The pixel circuit according to (12),
wherein an inverting input of the amplifier circuit is electrically connected to a detector electrode of the photoelectric conversion element, a non-inverting input of the amplifier circuit is electrically connected to a reference voltage node and an output of the amplifier circuit is configured to control the buffer transistor.

(14) A solid-state imaging device, including:
a pixel array unit including a plurality of pixel circuits, wherein each pixel circuit includes:
  a photoelectric conversion circuit configured to generate and output a photocurrent;
  an integration capacitor including a storage electrode and a reference electrode, wherein the reference electrode is connected to a first supply potential, and wherein the integration capacitor is configured to integrate the photocurrent on the storage electrode in an integration period; and
  a supplementary circuit configured to pre-charge a working node between the photoelectric conversion circuit and the storage electrode to a pre-charge potential different from the first supply potential.

(15) The solid-state imaging device according to (14), further including an auxiliary control unit configured to generate and output one or more supplementary control signals electrically connected to the supplementary circuit.

The invention claimed is:
1. A pixel circuit, comprising:
a photoelectric conversion circuit configured to generate and output a photocurrent;
an integration capacitor comprising a storage electrode and a reference electrode, wherein the reference electrode is connected to a first supply potential, and wherein the integration capacitor is configured to integrate the photocurrent on the storage electrode in an integration period; and
a supplementary circuit configured to pre-charge a working node between the photoelectric conversion circuit and the storage electrode to a pre-charge potential different from the first supply potential,
wherein the supplementary circuit comprises an auxiliary capacitor comprising a first electrode and a second electrode,
wherein the first electrode is electrically connected to the working node,
wherein the second electrode and the storage electrode of the integration capacitor are electrically connected to a center tap node, and
wherein the supplementary circuit is configured to pre-charge the working node by (i) pre-charging, with the working node connected to the first supply potential, the center tap node with a tap potential, and then (ii) connecting, with the working node disconnected from the first supply potential, the center tap node to the first supply potential.

2. The pixel circuit according to claim 1, wherein the pre-charge potential is selected such that a first potential difference between a second supply potential at a supply electrode of the photoelectric conversion circuit and the pre-charge potential is greater than a second potential difference between the second supply potential and the first supply potential.

3. The pixel circuit according to claim 1, wherein the supplementary circuit is configured such that the storage electrode is capacitively coupled to the photocurrent during the integration period.

4. The pixel circuit according to claim 1, wherein the supplementary circuit is configured to pre-charge the working node by capacitor switching.

5. The pixel circuit according to claim 1, wherein the supplementary circuit is configured to pre-charge the working node by successively (i) pre-charging, with the working node connected to the first supply potential, the center tap node with a tap potential, and then (ii) connecting, with the working node disconnected from the first supply voltage, the center tap node to the first supply potential.

6. The pixel circuit according to claim 1, wherein the supplementary circuit comprises a first switch configured to electrically connect the working node and the reference electrode in a first phase of a pre-charge period.

7. The pixel circuit according to claim 6, wherein the supplementary circuit comprises a second switch configured to electrically connect the center tap node to a second supply voltage in the first phase of the pre-charge period.

8. The pixel circuit according to claim 7, wherein the supplementary circuit comprises a third switch configured to electrically connect the center tap node to the first supply potential in a second phase of the pre-charge period.

9. The pixel circuit according to claim 8, wherein the supplementary circuit is configured to turn on the third switch after a delay with regard to a turn off of the first switch.

10. The pixel circuit according to claim 8, wherein the supplementary circuit is configured to turn on the third switch after a delay with regard to a turn off of the first switch.

11. The pixel circuit according to claim 1, wherein the photoelectric conversion circuit comprises:
a photoelectric conversion element configured to convert radiation into the photocurrent and
a buffer transistor with a load path electrically connected in series between the photoelectric conversion element and the working node.

12. The pixel circuit according to claim 11, wherein the photoelectric conversion circuit further comprises an amplifier circuit configured to control the buffer transistor to keep a bias voltage across the photoelectric conversion element constant for different photocurrents.

13. The pixel circuit according to claim 12, wherein an inverting input of the amplifier circuit is electrically connected to a detector electrode of the photoelectric conversion element, a non-inverting input of the amplifier circuit is electrically connected to a reference voltage node and an output of the amplifier circuit is configured to control the buffer transistor.

14. A solid-state imaging device, comprising:
a pixel array unit comprising a plurality of pixel circuits, wherein
each pixel circuit comprises:
a photoelectric conversion circuit configured to generate and output a photocurrent;
an integration capacitor comprising a storage electrode and a reference electrode, wherein the reference electrode is connected to a first supply potential, and wherein the integration capacitor is configured to integrate the photocurrent on the storage electrode in an integration period; and
a supplementary circuit configured to pre-charge a working node between the photoelectric conversion circuit and the storage electrode to a pre-charge potential different from the first supply potential,
the supplementary circuit comprises an auxiliary capacitor comprising a first electrode and a second electrode,
the first electrode is electrically connected to the working node,
the second electrode and the storage electrode of the integration capacitor are electrically connected to a center tap node, and
the supplementary circuit is configured to pre-charge the working node by (i) pre-charging, with the working node connected to the first supply potential, the center tap node with a tap potential, and then (ii) connecting, with the working node disconnected from the first supply potential, the center tap node to the first supply potential.

15. The solid-state imaging device according to claim 14, further comprising an auxiliary control unit configured to generate and output one or more supplementary control signals electrically connected to the supplementary circuit.

* * * * *